Figure 1:
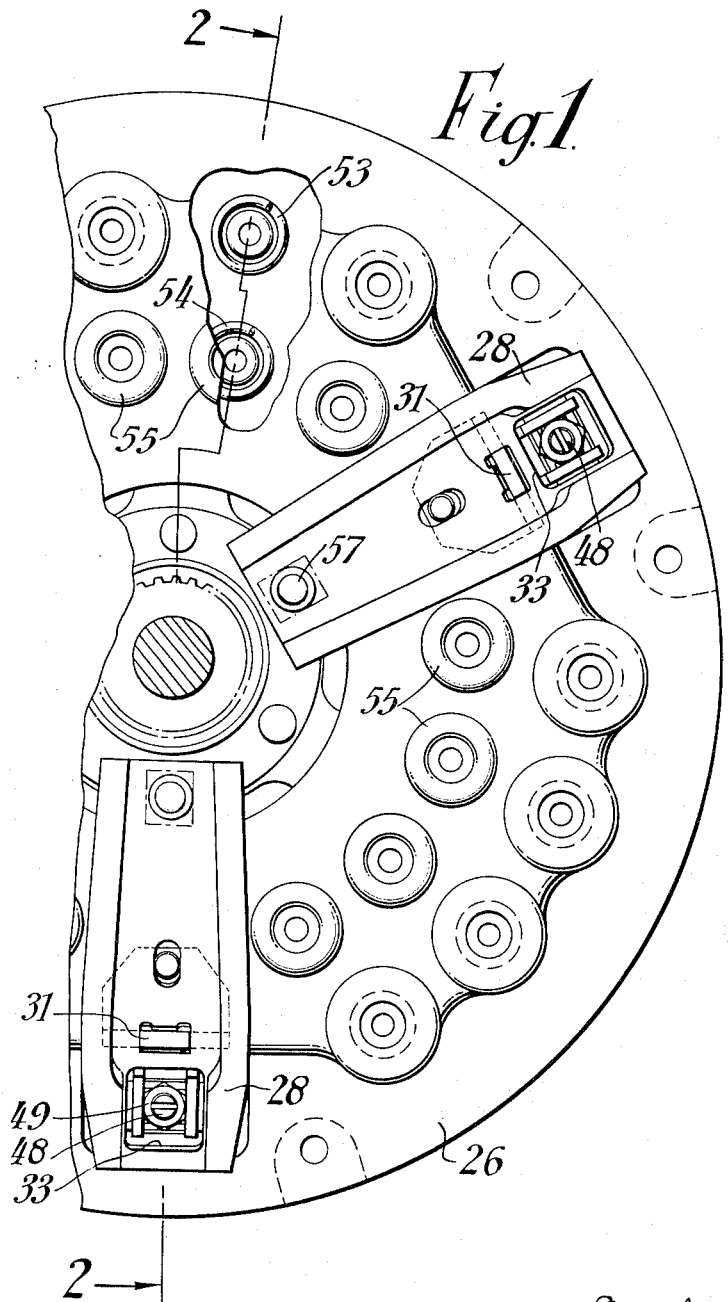

Oct. 12, 1965   F. CRUTCHLEY   3,211,265
FRICTION CLUTCHES
Filed Oct. 23, 1963   2 Sheets-Sheet 1

Inventor
Frederick Crutchley
By
Winter, Ray, Adams & Tockman
attorneys

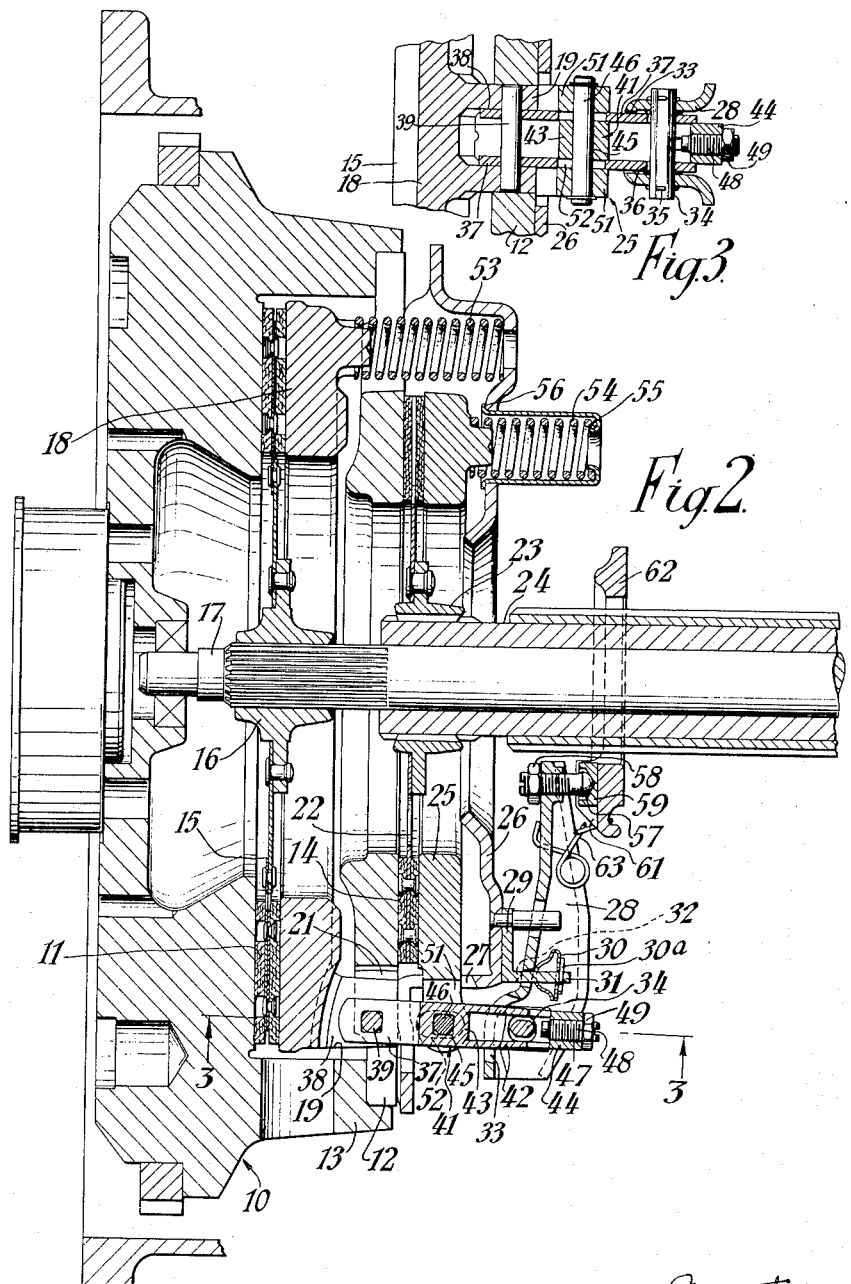

United States Patent Office 3,211,265
Patented Oct. 12, 1965

3,211,265
FRICTION CLUTCHES
Frederick Crutchley, Leamington Spa, England, assignor to Automotive Products Company Limited, Leamington Spa, England
Filed Oct. 23, 1963, Ser. No. 318,437
Claims priority, application Great Britain, Oct. 25, 1962, 40,450/62
1 Claim. (Cl. 192—48)

This invention relates to friction clutches of the kind in which rotation can be transmitted from a driving shaft or equivalent member to one of two driven shafts alone or to both of said driven shafts simultaneously, the clutch comprising a flywheel or other driving member having two driving surfaces against which two driven plates, one associated with each driven shaft, are respectively clamped by two pressure plates, the two pressure plates being retractable to release the driven plates by a single set of release levers having lost motion relative to one pressure plate so that they can move idly with respect to that pressure plate whilst retracting the other.

The object of the present invention is to provide an improved arrangement of the releasing mechanism for such a clutch.

According to the present invention, in a friction clutch comprising a driving member so formed as to provide two separate annular driving faces, two driven plates each associated with one of said driving faces and arranged to transmit rotation each to one of two separate driven shafts, two pressure plates, spring means acting on the pressure plates to clamp the respective driven plates between the said pressure plates and the flywheel driving faces, and a single set of release levers operable to retract both pressure plates and so release the driven plates, the release levers are pivotally mounted on a clutch cover plate so as to extend radially of the clutch and are each connected by separate links to the two pressure plates, movement of the said release lever being transmitted to both links through a common connecting member, the release lever having adjustable lost motion relative to one of the said links and being operated to release the clutch by a release lever plate.

Each release lever preferably includes a release-lever-plate engaging part which is adjustable relative to said lever.

Preferably one of the links comprises a pair of plates lying one on each side of the other link, one of the links being provided with an elongated slot through which the connecting member passes, and means being provided to vary the effective length of the said slot, and the other link being coupled to the pressure plate which it operates by a pin passing with clearance through holes in the said side plates.

The invention is hereinafter described with reference to the accompanying drawings which illustrate, by way of example, one form of friction clutch according to the invention and in which:

FIGURE 1 is a partial end elevation of the friction clutch;
FIGURE 2 is a section on the line 2—2 of FIGURE 1; and
FIGURE 3 is a section on the line 3—3 of FIGURE 2.

Referring to the drawings, a flywheel 10 constituting the driving member of the clutch is recessed on one side, an annular driving face 11 being formed in the recess, and an annular plate 12 fixed, by means not shown, to the peripheral wall 13 surrounding the recess provides, on its outer surface, a second annular driving face 14. A first driven plate 15 having a splined hub 16 mounted on splines on a first driven shaft 17 co-operates with the driving face 11 in the recess, being urged against the said driving face by a first pressure plate 18 disposed in the recess between the said driven plate 15 and the annular plate 12. The pressure plate 18 is coupled to the flywheel 10 for rotation therewith by lugs 19 on the said pressure plate extending into slots or openings 21 in the annular plate 12. A second driven plate 22 having a splined hub 23 mounted on splines on a second tubular driven shaft 24 surrounding the first driven shaft 17 co-operates with the driving face 14 on the annular plate 12, being urged against the said driving face 14 by a second pressure plate 25. The second pressure plate 25 is covered by a cover plate 26 of generally dished form which is secured at its periphery by means (not shown) to the peripheral wall 13 of the flywheel recess, the said pressure plate 25 being formed with lugs projecting radially through slots 27 in the said cover plate 26 to cause the said pressure plate 25 to rotate with the flywheel.

Radial release levers 28 are pivotally mounted on the cover plate 26, the said cover plate having secured thereto a number of L-shaped brackets 29 each having a portion 31 of reduced width projecting through a transverse slot in the release lever, and having knife edges 32 on each side of the projecting portion about which the lever pivots. The release levers 28 are returned in engagement with the knife edges 32 by resilient sheet metal retaining members 30 slotted to pass over the bracket portions 31 and retained in position by split pins 30a. Slots 33 are cut in the levers 28 adjacent their outer ends, and connecting members 34 are mounted between the side walls of the levers opposite the slots 33, the members 34, which are of rectangular cross-section with their corners chamfered to provide knife edges, being held against rotation by engagement in correspondingly shaped holes in the said side walls, and being retained in position axially by split pins 35.

The connecting member 34 associated with each release lever 28 passes through holes 36 in a pair of strip-like metal plates 37 extending through the slot 33 and into a radial slot 38 in one of the lugs 19 on the pressure plate 18, the said plates 37 being coupled to the pressure plate 18 by a pivot pin 39 extending across the slot 38. The strip-like metal plates 37 thus constitute a link connecting the release lever 28 to the pressure plate 18.

A second link 41 is mounted between the two plates 37, the said second link comprising a pair of metal strips 42 having secured between them by welding two metal blocks 43 and 44, of which the former is apertured at 45 to receive a pivot pin 46 connecting the said link to the pressure plate 25, and the latter is formed with a tapped hole 47, parallel to the length of the link, to receive a grub screw 48 capable of being locked by a nut 49.

The connecting member 34 passes between the metal strips 42 of the link 41, at a point between the two blocks 43 and 44.

The lugs on the pressure plate 25 which project through the slots 27 are bifurcated so that they each comprise two limbs 51 extending one on each side of the plates 37, so that the second link 41 also lies between them. The pivot pin 46 passes through holes in the said limbs 51, and also through elongated holes 52 in the plates 37.

The pressure plates 18 and 25 are both urged towards the respective driving faces 11 and 14 by coiled compression springs, the springs 53 acting on the pressure plate 18 reacting directly on the cover plate 26, and the springs 54 acting on the pressure plate 25 reacting on thimbles 55 supported in holes in the cover plate by flanges 56 thereon, so that these springs also react indirectly on the cover plate.

The release levers 28 are drilled and tapped at their inner ends to receive adjusting studs 57, adapted to be locked by lock nuts 58, slippers 59 mounted on the studs 57 being radially slidable in grooves 61 in a release lever plate 62 arranged to be acted on by a conventional clutch release bearing to disengage the clutch. Resilient wire retainers 63 hold the release lever plate 62, the slippers 59 and the release levers 28 in their required relative positions.

It will be apparent that when the release levers 28 are acted upon by the release bearing to move their inner ends towards the flywheel, a pull is applied immediately to the links constituted by the metal plates 37 and is transmitted to the first pressure plate 18 without lost motion to pull that pressure plate away from the flywheel driving face 11 and release the first driven plate 15. The grub screws 48 are so set in the blocks 44 of the links 41 that, when the clutch is engaged the ends of the said grub screws are spaced from the connecting members 34, so that the release levers can move to disengage the driven plate 15 without moving the pressure plate 25. After a predetermined movement of the release levers, the connecting members 34 mounted therein engage the grub screws 48 mounted in the links 41 and a pull is applied through those links to the second pressure plate 25 to move it away from the driving face 14 on the annular plate 12 and release the second driven plate 22.

The grub screws in the links 41 enables the lost motion between those links and the release levers 28 to be maintained constant despite differences in the rate of wear of the friction facings on the two driven plates 15 and 22.

I claim:

A friction clutch comprising a driving member with two separate annular driving faces, a first driven plate and a first pressure plate, said first driven plate being positioned between the first driving face and said first pressure plate and adapted to be engaged by said face and plate for rotation thereby, a second driven plate and a second pressure plate, said second driven plate positioned between the second driving face and the second pressure plate and adapted to be engaged by said second face and second pressure plate for rotation thereby, separate driven shafts connected to the first and second driven shafts respectively for rotation thereby, spring means acting on said pressure plates to clamp each driven plate between its respective driving face and respective pressure plate, a clutch cover plate secured to said driving member, a single set of radially extending release levers, means pivotally connecting said release levers to said cover plate for retracting said pressure plates from engagement with its respective driven plate, a release lever plate, adjustable release plate means carried by each lever and engaging said release lever plate, said adjustable release plate means being adjustable relative to its respective lever, a connecting member connected to each lever, a first link and a second link connected to each lever connecting member for transmitting movement from the lever to both links, said first link comprising a pair of plates lying on each side of said second link, said first link being provided with holes through which said connecting member passes, said second link including longitudinally spaced blocks between which said connecting member passes, an adjustable abutment for each connecting member mounted in one block of each said link, a pin passing through holes in said plates and connecting said first link to said first pressure plate, said plates having elongated holes therein, a second pin passing through said holes with clearance therebetween and connecting said second link to said second pressure plate.

References Cited by the Examiner

UNITED STATES PATENTS

| 2,854,110 | 9/58 | Senkowski et al. | 192—48 |
| 2,899,897 | 8/59 | Ludwig | 192—48 |
| 3,021,931 | 2/62 | Holz | 192—48 |

FOREIGN PATENTS

| 23,091 | 5/62 | Germany. |
| 457,023 | 11/36 | Great Britain. |

DON A. WAITE, *Primary Examiner.*

DAVID J. WILLIAMOWSKY, *Examiner.*